United States Patent
Sol et al.

[11] Patent Number: 5,132,906
[45] Date of Patent: Jul. 21, 1992

[54] ROAD SURFACE FRICTION AND HILL SLOPE ESTIMATOR

[75] Inventors: David Sol, Dearborn; Ross M. Stuntz, Birmingham, both of Mich.

[73] Assignee: Ford Motor Company, Dearborn, Mich.

[21] Appl. No.: 535,678

[22] Filed: Jun. 11, 1990

[51] Int. Cl.⁵ .............................................. B60T 8/58
[52] U.S. Cl. .................... 364/426.02; 364/551.01; 180/197; 73/105; 303/103
[58] Field of Search ..................... 364/426.01, 426.02, 364/426.03, 550, 551.01; 73/9, 105; 303/100, 103, 106; 280/707; 180/197

[56] References Cited

U.S. PATENT DOCUMENTS

| | | | |
|---|---|---|---|
| 4,545,240 | 10/1985 | Leiber | 73/9 |
| 4,665,490 | 5/1987 | Masaki et al. | 303/100 |
| 4,666,218 | 5/1987 | Masaki et al. | 364/426.02 |
| 4,669,569 | 6/1987 | Suzuki et al. | 180/249 |
| 4,693,522 | 9/1987 | Wupper et al. | 303/105 |
| 4,715,662 | 12/1987 | Van Zanten et al. | 303/100 |
| 4,725,102 | 2/1988 | Ando et al. | 303/100 |
| 4,763,260 | 8/1988 | Sakuma et al. | 303/100 |
| 4,779,447 | 10/1988 | Rath | 73/9 |
| 4,794,538 | 12/1988 | Cao et al. | 364/426.02 |
| 4,834,419 | 5/1989 | Kozaki et al. | 280/707 |
| 4,837,727 | 6/1989 | Tashiro et al. | 73/105 |
| 4,883,325 | 11/1989 | Shimanuki et al. | 364/426.02 |
| 4,900,100 | 2/1990 | Higashimata et al. | 303/103 |
| 4,936,636 | 6/1990 | Matsuda | 303/103 |
| 4,947,332 | 8/1990 | Ghoneim | 364/426.03 |

Primary Examiner—Gary Chin
Attorney, Agent, or Firm—Allan Lippa; Roger May

[57] ABSTRACT

A system and method for estimating hill slope and coefficient of friction for a road surface from vehicle and engine measurements. A first variable related to hill slope and a second variable related to road surface coefficient of friction are generated from the vehicle and engine measurements and may be used in a variety of control applications. The method includes the steps of generating a first variable related to the slope of the hill and a second variable related to the coefficient of friction of the road surface. The hill slope can be determined from the first variable and the coefficient of friction of the road surface can be determined from the second variable. These estimated values can then be used in control applications. The braking and traction control systems of a vehicle respond to a first variable related to hill slope and a second variable related to road surface of coefficient of friction.

23 Claims, 2 Drawing Sheets

ROAD SURFACE FRICTION AND HILL SLOPE ESTIMATOR

BACKGROUND OF THE INVENTION

The present invention relates generally to an estimating device for vehicles and, more particularly, to a vehicle estimating device which estimates the road surface coefficient of friction and the slope or grade of a hill a vehicle is climbing.

It is well known in the art to apply anti-skid control systems to vehicles to achieve a satisfactory rotational behavior of the wheels of a motor vehicle during a braking operation. Anti-skid systems are typically designed to increase and reduce brake fluid pressure in a desirable manner to prevent the wheels from becoming locked. Known anti-skid braking control systems use various mathematical manipulations to determine the speed of a vehicle for comparison with the rotational speed of a given vehicle wheel to calculate wheel "slip" for that wheel, wheel slip being a parameter needed in order to make decisions concerning wheel lock control.

Additionally, it is known to provide traction control strategies which attempt to maximize vehicle acceleration and prevent overspin of the wheels. Since the surface condition of a road and the slope or grade of the road surface directly affect braking and traction, the efficiency of control devices such as braking control devices and traction control devices, could be improved if there were a method or apparatus capable of determining road surface coefficient of friction and hill slope.

Of particular interest in both braking and traction control devices is the road surface coefficient of friction, since wheel locking tends to occur when the motor vehicle is braking on a road surface With a very low coefficient of friction. One method for calculating the coefficient of friction between a vehicle tire and a road surface is disclosed in U.S. Pat. No. 4,779,447, issued to Rath. The Rath method uses a brake torque measurement to control vehicle brakes. However, since the method is not applicable to a traction control system, an additional calculation of the coefficient of friction is necessary for vehicle traction control.

Another example of a braking pressure control method is disclosed in U.S. Pat. No. 4,763,260 issued to Sakuma et al. In the Sakuma et al reference, ratios of various vehicle and engine conditions are used and an empirical estimation of the coefficient of friction is made in an antiskid control device. However, the ratios and the empirical friction coefficient estimation assume uniform, unchanging, flat road surface slip characteristics. Also, the values provided by the system are not made available for use with any other control devices, such as vehicle traction control.

In U.S. Pat. No. 4,794,538, issued to Cao et al, a method of controlling vehicle wheels to prevent skidding on a variety of surfaces is disclosed. The Cao et al reference measures wheel speed and braking pressure to calculate the coefficient of friction and, based on the calculated value of the coefficient of friction, adjusts wheel spin by controlling the braking pressure. However, a disadvantage to the method disclosed in Cao et al is that a friction-slip curve characteristic is assumed, with a fixed shape. With changing road conditions, the method may not necessarily be consistent with the laws of nature as operating conditions jump among a family of such curves, whereas the method assumed one such fixed curve. Additionally, the method does not consider whether or not the vehicle is on a sloping surface when controlling the braking pressure. Finally, the determined values are not made available for use with other control devices.

One antiskid device which also attempts to include hill slope in its brake control device is disclosed in U.S. Pat. No. 4,725,102, issued to Ando et al. In the Ando et al reference, the brake control device includes a hardware configured hill slope sensor. However, since the system does not output a coefficient of friction value or an actual hill slope value, the measurements and calculations are not available for use with other control devices.

Finally, U.S. Pat. No. 4,693,522, issued to Wupper et al includes a friction coefficient identification circuit to estimate the road surface coefficient of friction. However, the Wupper et al reference has no traction control application, as it is strictly an anti-skid position system. Additionally, the Wupper et al reference does not disclose a hill slope estimator or any other method of determining hill slope and including that determination in the braking control system.

It is seen then that there is a need for a method and apparatus capable of providing estimates of various external conditions from vehicle and engine measurements, which estimations can be made available for use in a variety of control applications.

Summary of the Invention

In accordance with the present invention, this need is met by providing a system and method for estimating external conditions from vehicle and engine parameters. Specifically, the invention estimates the road surface coefficient of friction and the slope or grade of a hill the vehicle is attempting to climb. The present invention improves vehicle safety, stability, and performance by providing estimates of unmeasurable external conditions.

The present invention provides a method for a vehicle being driven on a road surface comprising the steps of: generating a first variable related to the slope of the hill; generating a second variable related to the coefficient of friction of the road surface; estimating the slope of the hill from the generated first variable; estimating the coefficient of friction of the road surface from the second variable; and making the estimated hill slope and coefficient of friction values available for use in control applications.

In a preferred embodiment of the present invention, the first variable is generated by filtering and then differentiating driven wheel speed and non-driven wheel speed of the vehicle, and the second variable is generated from torque estimates and the first variable. An advantage of the above method is that it estimates unmeasurable and changing external conditions from vehicle and engine measurements. Vehicle performance and safety can be improved by providing these estimates of environmental. disturbances to vehicle control devices.

In a further aspect of the invention, the method comprises the steps of utilizing a variety of vehicle and engine conditions including: vehicle mass, vehicle wheel radius, vehicle rotating wheel inertia, and acceleration of gravity; and measuring or estimating other vehicle and engine conditions including: vehicle engine torque, vehicle brake torque, vehicle axle torque, vehicle wheel torque, vehicle brake pressure, vehicle throttle position, vehicle engine speed, vehicle driven wheel speed, and vehicle non-driven wheel speed. The method further includes the steps of: generating a first variable related to the slope of the hill; generating a second variable related to the coefficient of friction of the road surface; and estimating hill slope and coefficient of friction values from the first and second generated variables.

The present invention also provides a system for estimating external conditions for a vehicle comprising: a first variable related to the hill slope, wherein the first variable is generated by determining, filtering and then differentiating driven wheel speed and non-driven wheel speed of the vehicle; a second variable related to the coefficient of friction of the road surface, wherein the second variable is generated from axle torque and the first variable; means for estimating the hill slope from the first variable; means for estimating the coefficient of friction of the road surface from the second variable; and means for providing the estimated value of the hill slope and the estimated value of the coefficient of friction of the road surface for use in control applications, such as the brake control system or the traction control system of the vehicle.

In a further aspect of the invention, the system for estimating external conditions for a vehicle comprises: means for utilizing vehicle mass; means for utilizing vehicle wheel radius; means for utilizing vehicle rotating wheel inertia; means for utilizing acceleration of gravity; means for estimating vehicle engine torque; means for estimating vehicle axle torque; means for estimating vehicle brake torque; means for estimating vehicle wheel torque; means for measuring vehicle throttle position; means for measuring vehicle engine speed; means for measuring vehicle driven wheel speed; means for measuring vehicle non-driven wheel speed; means for generating a first variable related to the slope of the hill, the first variable based on the vehicle measurements; and means for generating a second variable related to the coefficient of friction of the road surface, the second variable based on the vehicle measurements and the first variable.

In a preferred embodiment of the invention, the means for measuring the vehicle driven wheel speed further includes means for filtering and differentiating the wheel speed measurement, and the means for measuring the vehicle non-driven wheel speed further includes means for filtering and differentiating the wheel speed measurement.

Other objects and advantages of the invention will be apparent from the following description, the accompanying drawings and the appended claims.

Description of the Preferred Embodiment

Figure 1:
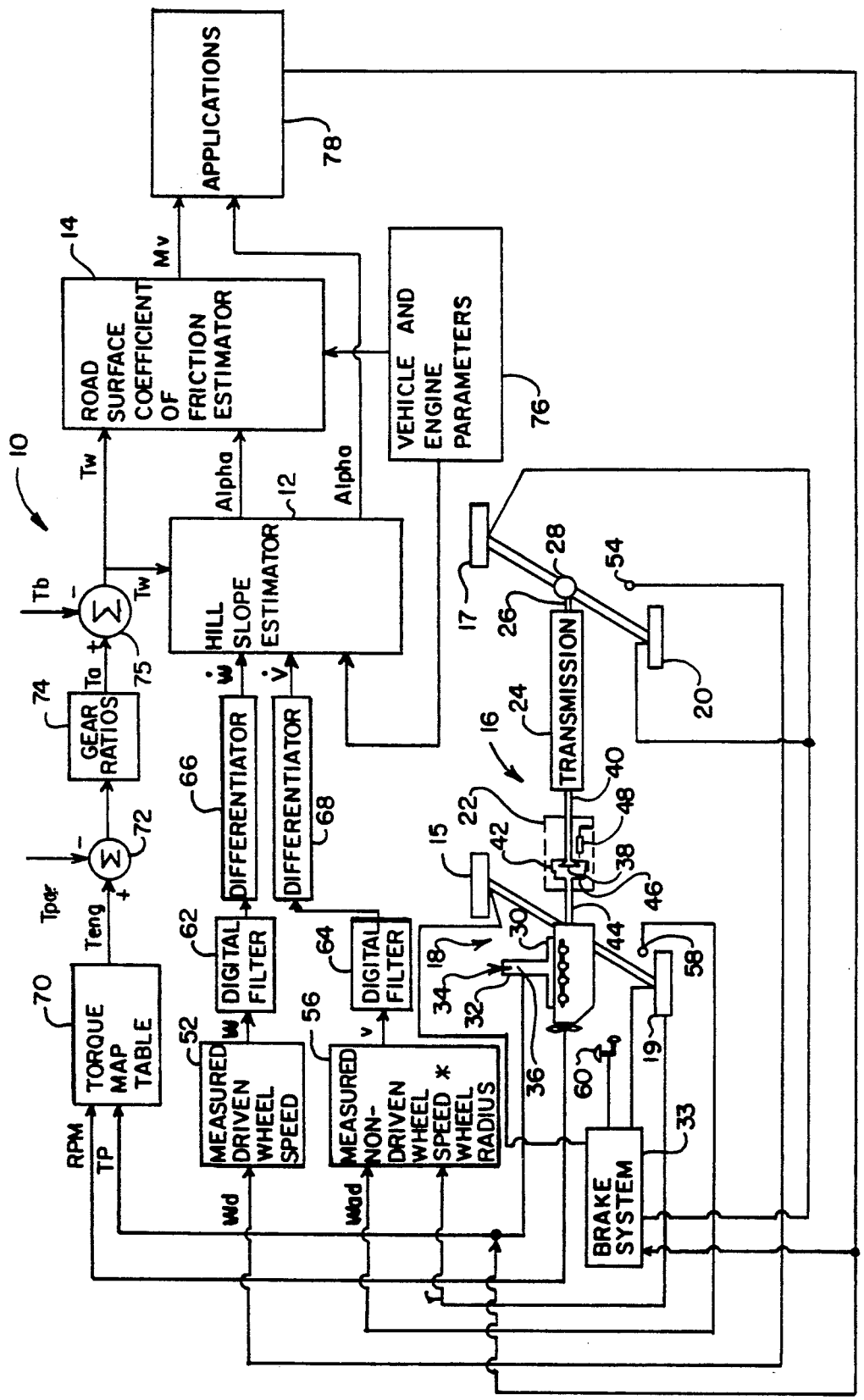
FIG. 1 is a schematic showing a conventional motor vehicle utilizing the system and method for estimating external conditions described herein.

Referring first to FIG. 1, reference number 10 generally refers to a system for estimating external conditions for a motor vehicle as described herein. The schematic of a motor vehicle which utilizes the system 10 is also shown in FIG. 1. In general terms which are described in greater detail hereinafter, hill slope estimator 12 and coefficient of friction estimator 14 are shown as generated signals receiving inputs from, and controlling motor vehicle 16 when measured vehicle and engine parameters exceed desired or preselected values. Hill slope estimator 12 generates a first variable related to the slope of the hill which the vehicle is on, and coefficient of friction estimator 14 generates a second variable related to the coefficient of friction of the road surface on which the vehicle is travelling. A particular advantage of the present invention is that the estimated hill slope from estimator 12 and the estimated coefficient of friction from estimator 14 can be input to many control systems capable of a variety of vehicle control applications.

Motor vehicle 16 is shown in this particular example as having four wheels, 15, 17, 19, and 20, and an internal combustion engine 18 coupled to drive wheel 20 via clutch 22, automatic transmission 24, drive shaft 26, and differential/axle 28. Engine 18 is shown in this example as including an intake manifold 30 for inducting an air/fuel mixture therein via air/fuel intake 32. Fuel injector 34, shown as a portion of a central fuel injected system in this example, injects fuel into air/fuel intake 32. Throttle plate 36 is shown here for adjusting flow through the air/fuel intake 32 in a conventional manner. Finally, the vehicle 16, powered by the engine 18, includes an operator actuated brake system 33, associated with the wheels 15, 17, 19, and 20, and having a standard brake pedal 60.

It is to be understood that the estimating system and method described herein may be used to advantage with any type of combustion engine such as, for example, carbureted engines, multiport fuel injected engines, and direct fuel injected engines. Further, the system is not limited to automobiles, but may be used to advantage with any apparatus having an engine coupled to a drive wheel through an axle.

Continuing with FIG. 1, clutch 22 is shown including clutch plates 38 coupled to transmission shaft 40, and friction elements 42 operably coupled to engine shaft 44 via clutch housing 46. Hydraulic piston 48 is shown coupled to friction elements 42 for coupling and decoupling clutch plates 38 to friction elements 42 thereby coupling and decoupling engine 18 to transmission 24. The amount of torque coupled from engine 18 to transmission 24 is controlled by slippage of clutch 22.

Figure 2:
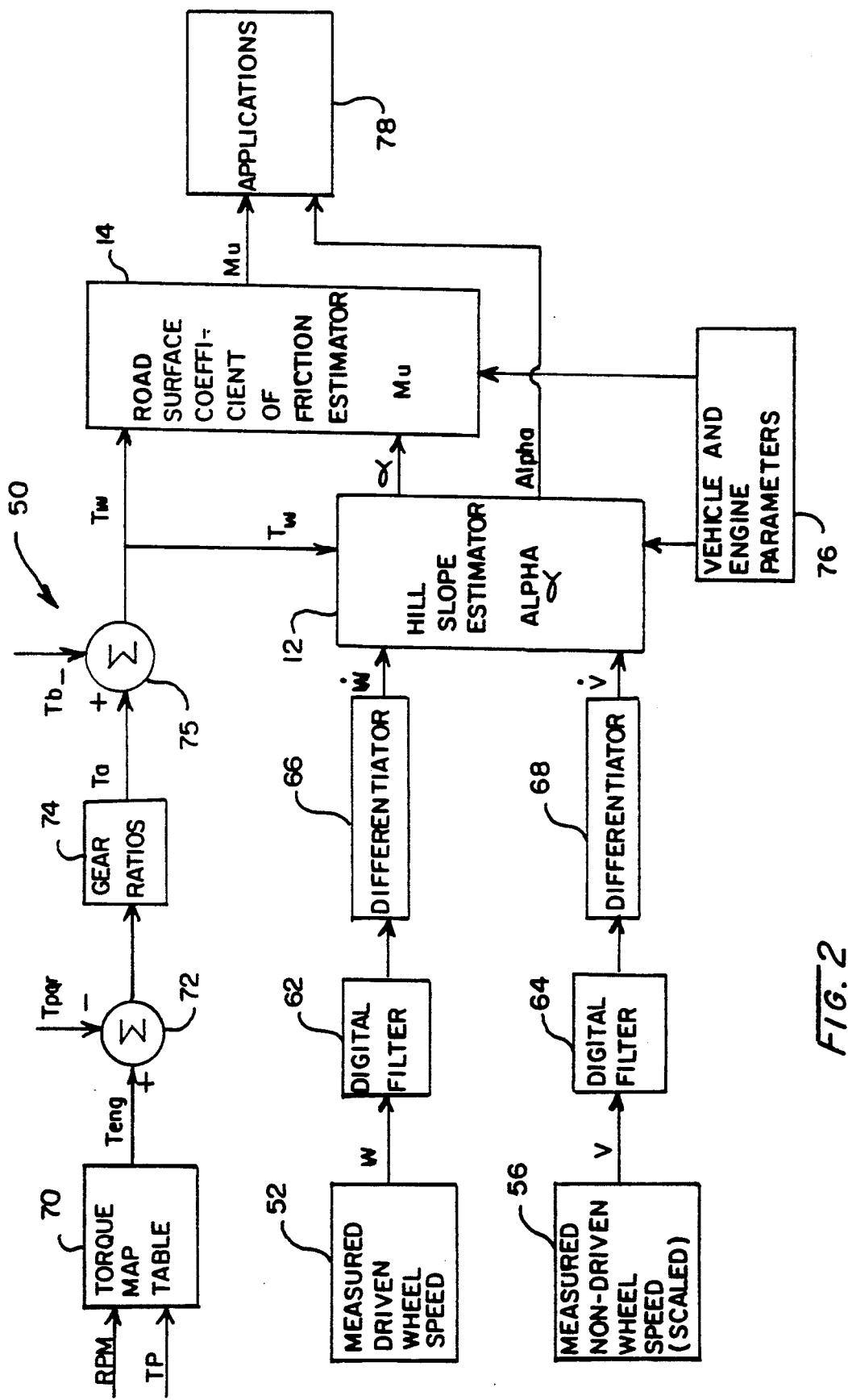
FIG. 2 is an electrical block diagram of the system and method for estimating external conditions as shown in FIG. 1.

Referring now to FIG. 2, and continuing with FIG. 1, the hill slope estimator 12 and the coefficient of friction estimator 14 are shown schematically as part of a block diagram 50 of computational and measurement steps represented as blocks. Each block shown herein describes an operation performed by the system 10. It is noted that these operations may also be performed by discrete components wherein each block comprises an array of circuits such as, for example, integrated circuit adders and multipliers.

The measured driven wheel speed block 52 is shown receiving a signal $w_d$ from a sensor 54 proportional to the speed of the driven wheel 20. Likewise, the measured non-driven wheel speed block 56 is shown receiving a signal $w_{nd}$ from a sensor 58 proportional to the speed of non-driven wheel 19. Vehicle velocity can be determined by multiplying the measured non-driven wheel speed $w_{nd}$ by the wheel radius, r, to produce a velocity signal v. Signals $w_d$ and v are supplied to digital filters 62 and 64, respectively, to be filtered. The filtered $w_d$ and v signals are then differentiated at differentiators 66 and 68, respectively, to provide signals $\dot{w}$ and v̇, respectively, which signals represent time derivatives of $w_d$ and v, respectively.

Continuing with FIGS. 1 and 2, throttle position TP and vehicle engine speed RPM measurements are supplied to a torque map table 70 and processed to provide an engine torque estimate. Alternatively, an estimate can be provided utilizing engine manifold air pressure (MAP), RPM, and the like if an engine computer is installed in the vehicle and programmed to provide such a signal. The engine torque measurement, Teng, and the negative of a parasitic torque measurement, Tpar, are summed at summer 72 and provided to a gear ratios block 74. An axle torque Ta thus can be inferred from an engine torque look-up table or map table 70 and the gear ratios block 74. Alternatively, a direct measurement of axle torque on the shaft may be used if such a sensor is installed. The parasitic torque value is derived from the amount of torque lost to the alternator, the air conditioner, and any other vehicle components which drain the torque. The axle torque Ta is summed at summer 75 with a negative brake torque, Tb, to provide a wheel torque value, Tw, to the estimators 12 and 14. The summer 75 accomplishes a unique function in that if the vehicle operator suddenly accelerates and causes wheel spin, only axle torque is used in the determination of wheel torque. However, if the vehicle operator applies the brakes, brake torque is also included in the wheel torque calculation.

In addition, a vehicle and engine parameters block 76 provides signals such as r, m, g, and J, representing the wheel radius, the vehicle mass, the acceleration of gravity, and the rotating wheel inertia to the hill slope estimator 12 and the coefficient of friction estimator 14. The signals ẇ, v̇, Tw, r, m, g, and J are utilized by the hill slope estimator 12 to provide an estimate of the slope of the hill on which the vehicle is travelling, which estimate is referred to as Alpha and represented by the following equation:

$$Alpha = \sin^{-1}[[(Tw)-(J\dot{w})-(rm\dot{v})]/[(rmg)]]$$

The estimated Alpha value may then be supplied with the wheel torque measurement to the road surface coefficient of friction estimator to estimate the coefficient of friction of the road surface on which the vehicle is travelling, which estimate is referred to as Mu and represented by either of the following equations:

$$Mu = [(Tw)-(J\dot{w})]/[(rmg) * \cos(Alpha)]$$

or $$Mu = [Tw-(J\dot{w})]/[(rmg)^2-(Ta-J\dot{w}-rmv)^2]^{\frac{1}{2}}$$

The estimates of hill slope and coefficient of friction of road surface are useful in a variety of applications, particularly control applications. As shown in FIGS. 1 and 2, the estimated values for Alpha and Mu can be supplied to an applications block 78. For instance, applications block 78 can be a traction control device which utilizes traction control strategies in vehicles which attempt to maximize vehicle acceleration on slippery surfaces, prevent overspin of the wheels and enable the vehicle to climb a slippery hill. Similarly, applications block 78 may consist of a brake control device for controlling the level of brake pressure being applied to the vehicle, based on the generated first variable Alpha related to the slope of the hill and the generated second variable Mu related to the coefficient of friction of the road surface. The present invention is useful for applying estimates of external conditions to vehicle control applications, thereby improving vehicle performance, safety, and stability.

Having described the invention in detail and by way of reference to preferred embodiments thereof, it will be apparent that other modifications and variations are possible without departing from the scope of the invention defined in the appended claims.

What is claimed is:

1. A method for estimating external conditions for a vehicle having an engine, wheels, an axle, a throttle, and brakes, the vehicle being driven on a road surface having a coefficient of friction and at least one hill slope, the method comprising the steps of:
   generating a first variable related to the hill slope, said first variable generated by determining, filtering and then differentiating driven wheel speed and non-driven wheel speed of the vehicle;
   generating a second variable related to the coefficient of friction of the road surface, said second variable generated from axle torque and said first variable;
   estimating the hill slope from said generated first variable;
   estimating the coefficient of friction of the road surface from said generated second variable; and
   inputting said estimated value o the hill slope and said estimated value of the coefficient of friction of the road surface to a brake control system for improving control of the level of brake pressure being applied to the vehicle.

2. A method as claimed in claim 1 further including the step of inputting said estimated value of the hill slope and said estimated value of the coefficient of friction of the road surface to a traction control system for improving control of the level of vehicle traction.

3. A method for estimating external conditions for a vehicle having an engine, wheels, an axle, a throttle, and brakes, the vehicle being driven on a road surface e having a coefficient of friction and at least one hill slope, the method comprising the steeps of:
   generating a first variable related to the hill slope, said first variable generated by determining, filtering and then differentiating driven wheel speed and non-driven wheel speed of the vehicle;
   providing the vehicle with a manifold air pressure sensor;
   deriving an axle torque from said manifold pressure sensor coupled to the engine;
   generating a second variable related to the coefficient of friction of the road surface, said second variable generated from said axle torque and said first variable;
   estimating the hill slope from said generated first variable;
   estimating the coefficient of friction of the road surface from said second variable; and
   inputting said estimated value o the hill slope and said estimated value of the coefficient of friction of the road surface to a brake control system for improving control of the level of rake pressure being applied to the vehicle.

4. A method for estimating external conditions for a vehicle having an engine, wheels, an axle, a throttle, and brakes, the vehicle being driven on a road surface having a coefficient of friction and at least one hill slope, the method comprising the steps of:

generating a first variable related to the hill slope, said first variable generated by determining, filtering and then differentiating driven wheel speed and non-driven wheel speed of the vehicle;

generating a second variable related to the coefficient of friction of the road surface, said second variable generated from wheel torque and said first variable;

estimating the hill slope from said generated first variable;

estimating the coefficient of friction of the road surface from said second variable; and p1 inputing said estimated value of the hill slope and said estimated value o the coefficient of friction of the road surface to a traction control system for improving control of the level of vehicle traction.

5. A method as claimed in claim 4 wherein said step of generating a second variable further includes the step of generating said wheel torque from axle torque and brake torque.

6. A method as claimed in claim 5 wherein said step of generating said wheel torque further includes the step of determining said axle torque from a manifold air pressure sensor coupled to the engine.

7. A method for estimating external conditions for a vehicle having an engine, wheels, an axle, a throttle, and brakes, the vehicle being driven on a road surface having a coefficient of fraction and at least one hill slope, the method comprising the steps of:
utilizing vehicle mass m;
utilizing vehicle wheel radius r;
utilizing vehicle rotating wheel inertia J;
utilizing acceleration of gravity g;
estimating vehicle wheel torque Tw;
measuring vehicle throttle position TP;
measuring vehicle engine speed RPM;
measuring vehicle driven wheel speed to receive a signal Wd;
filtering said signal Wd and, then, differentiating filtered signal Wd to provide a signal $\dot{w}$ representing the time derivative of driven wheel speed;
measuring vehicle non-driven wheel speed to receive a signal Wnd;
multiplying said signal Wnd by the wheel radius r to provide a vehicle velocity signal v, then, filtering said signal v, and, then, differentiating filtered signal v to provide a signal $\dot{v}$ representing the time derivative of vehicle velocity;
generating a first variable Alpha to estimate the slope of the hill in accord with the expression:

$$Alpha = \sin^1(((Tw) - (J\dot{w}) - (rm\dot{v}))/((rmg)))$$

generating a second variable Mu to estimate the coefficient of fraction o the road surface in accord with the expression:

$$Mu = ((Tw) - (J\dot{w}))/((rmg) \cos(Alpha));\text{ and}$$

inputing said hill slope estimate Alpha and said coefficient estimate Mu to a brake control system for improving control of the level of brake pressure being applied to the vehicle.

8. A method as claimed in claim 7 wherein the step of generating said second variable Mu to estimate the coefficient of friction of the road surface further includes utilizing axle torque Ta is in accord with the expression:

$$Mu = ((Tw) - (J\dot{w}))/((rmg)^2 - (Ta - J\dot{w} - rmv)^2)^{\frac{1}{2}}$$

9. A method for estimating external conditions for a vehicle having an engine, wheels, an axle, a throttle, and brakes, the vehicle being driven on a road surface having a coefficient of friction and at least one hill slope, the method comprising the steps of:
utilizing vehicle mass m;
utilizing vehicle wheel radius r;
utilizing vehicle rotating wheel inertia J;
utilizing acceleration of gravity g;
estimating vehicle wheel torque Tw;
measuring vehicle throttle position TP;
measuring vehicle engine speed RPM;
measuring vehicle driven wheel speed to receive a signal Wd;
filtering said signal Wd and, then, differentiating filtered signal Wd to provide a signal $\dot{w}$ representing the time derivative of driven wheel speed;
measuring vehicle non-driven wheel sped to receive a signal Wnd;
multiplying said signal Wnd by the wheel radius r to provide a vehicle velocity signal v, then, filtering said signal v, and, then, differentiating filtered signal v to provide a signal $\dot{v}$ representing the time derivative of vehicle velocity;
generating a first variable Alpha to estimate the slope of the hill in accord with the expression $$Alpha = \sin^1(((Tw) - J\dot{w}) - (rm\dot{v}))/((rmg)));$$

generating a second variable Mu to estimate the coefficient of friction of the road surface in accord with the expression $$Mu = ((Tw) - (J\dot{w}))/((rmg) \cos(Alpha));\text{ and}$$

inputting said hill slope estimate Alpha and said coefficient of friction estimate Mu to a traction control system for improving control of the level of vehicle traction.

10. A system for estimating external conditions for a vehicle having an engine, wheels, an axle, a throttle, and brakes, the vehicle being driven on a road surface having a coefficient of friction and at least one hill slope, the system comprising:
a first variable related to the hill slope, said first variable generated by determining, filtering and then differentiating driven wheel speed and non-driven wheel speed of the vehicle;
a second variable related to the coefficient of friction of the rod surface, said second variable generated from axle torque and said first variable;
means for estimating the hill slope form said generated first variable;
means for estimating the coefficient of friction of the road surface from said generated second variable; and
means for inputting said estimated value of the hill slope and said estimated value of the coefficient of friction of the road surface to a brake control system for improving control of the level of brake pressure being applied to the vehicle.

11. A system as claimed in claim 10 further including mans for inputting said hill slope estimate and said coefficient of friction estimate to a fraction control system for improving control of the level of vehicle traction.

12. A system for estimating external conditions for a vehicle having an engine, wheels, an axle, a throttle, and brakes the vehicle being driven on a road surface having a coefficient of friction and at least one hill slope, he comprising:
- a first variable related to the hill slope, said first variable generated by determining, filtering and then differentiating driven wheel speed and non-driven wheel speed of the vehicle;
- a manifold air pressure sensor;
- means for deriving an axle torque from said manifold pressure sensor coupled to the engine;
- a second variable related to the coefficient of friction of the road surface, said second variable generated from said axle torque and said first variable;
- means for estimating the hill slope from said generated first variable;
- means for estimating the coefficient of friction of the road surface from said second variable; and
- means for inputting said estimated value of the hill slope and said estimated value o the coefficient of friction of the road surface to a brake control system for improving control of the level of brake pressure being applied to the vehicle.

13. A system for estimating external conditions for a vehicle having an engine, wheels, an axle, a throttle, and brakes, the vehicle being driven on a road surface having a coefficient of fiction and at least one hill slope, the system comprising:
- a first variable related to the hill slope, said list variable generated by determining, filtering and then differentiating driven wheel speed and non-driven wheel speed of the vehicle;
- a second variable related to the coefficient of friction of the road surface, said second variable generated from wheel torque and said first variable;
- means for estimating the hill slope from said generated first variable;
- means for estimating the coefficient of friction of the road surface from said second variable; and
- means for inputting said estimated value of the hill slope and said estimated value of the coefficient of friction of the road surface to a traction control system for improving control of the level of vehicle traction.

14. A system as claimed in claim 13 wherein said second variable further comprises means for generating said wheel torque from axle torque and rake torque.

15. A system as claimed in claim 13 wherein said wheel torque further comprises means for determining axle torque from a manifold air pressure sensor coupled to the engine.

16. A system for estimating external conditions for a vehicle having an engine, wheels, an axle, a throttle, and brakes, the vehicle being driven on a road surface having a coefficient of friction and at least one hill slope, comprising:
- means for utilizing vehicle mass;
- means for utilizing vehicle wheel radius;
- means for utilizing vehicle rotating wheel inertia;
- means for utilizing acceleration of gravity;
- means for estimating vehicle engine torque;
- means for estimating vehicle axle torque;
- means for estimating vehicle brake torque;
- means for estimating vehicle wheel torque;
- means for measuring vehicle throttle position;
- means for measuring vehicle engine speed;
- means for measuring vehicle driven wheel speed;
- means for measuring vehicle non-driven wheel speed;
- means for generating a first variable to estimate the hill slope, said first variable based on said vehicle mass, said vehicle wheel radius, said vehicle rotating wheel inertia, said acceleration of gravity, said vehicle engine torque, said vehicle axle torque, said vehicle brake torque; said vehicle wheel torque; said vehicle throttle position, said vehicle engine speed, said vehicle driven wheel speed, and said vehicle non-driven wheel speed;
- means for generating a second variable to estimate the coefficient of friction of the road surface, said second variable based on said vehicle mass, said vehicle wheel radius, said vehicle rotating wheel inertia, said acceleration of gravity, said vehicle wheel torque, said vehicle driven wheel speed, said vehicle non-driven wheel speed, sand said first variable; and
- means for inputting said hill slope estimate and said coefficient of friction estimate to a bake control system for improving control of the level of brake pressure being applied to the vehicle.

17. A system as claimed in claim 16 further including means for inputting said hill slope estimate and said coefficient of friction estimate to a traction control system for improving control of the level of vehicle traction.

18. A system as claimed in claim 16 wherein the means for measuring the vehicle driven wheel speed further includes means for filtering and differentiating said wheel speed measurement.

19. A system as claimed in claim 16 wherein the means for measuring the vehicle non-driven wheel speed further includes means for filtering and differentiating said wheel speed measurement.

20. A system for estimating external conditions for a vehicle having an engine, wheels, an axle, a throttle, and brakes, the vehicle being driven on a road surface having a coefficient of friction and at last one hill slope, comprising:
- a vehicle mass value;
- a vehicle wheel radius value;
- a vehicle rotating wheel inertia value;
- an acceleration of gravity value;
- a vehicle engine torque estimate;
- a vehicle axle torque estimate;
- a vehicle brake torque estimate;
- a vehicle wheel torque estimate;
- a vehicle throttle position measurement;
- a vehicle engine speed measurement;
- a vehicle driven wheel speed measurement;
- a vehicle non-driven wheel speed measurement;
- a first variable measurement to estimate the slope of the hill, said first variable measurement based on said vehicle mass, said vehicle wheel radius, said vehicle rotating wheel inertia, said acceleration of gravity, said vehicle engine torque, said vehicle axle torque, said vehicle brake torque, said vehicle wheel torque, said vehicle throttle position, said vehicle engine speed, said vehicle driven wheel speed, and said vehicle non-driven wheel speed; and
- a second variable measurement to estimate the coefficient of friction of the road surface, said second variable measurement based on said vehicle mass, said vehicle wheel radius, said vehicle rotating wheel inertia, said acceleration of gravity, said vehicle wheel torque, said vehicle driven wheel speed, said vehicle non-driven wheel speed, and said first variable measurement; and means for inputting said hill slope estimate and said coefficient of.friction estimate to a fraction control system for improving control of the level of vehicle traction.

21. A system as claimed in claim 20 further including a means for inputting said hill slope estimate and said coefficient of friction estimate to a brake control system for improving control of the level of brake pressure being applied to the vehicle.

22. A system as claimed in claim 20 wherein said vehicle driven wheel speed measurement further includes a filtering and differentiating of said driven wheel speed measurement.

23. A system as claimed in claim 20 wherein said vehicle non-driven wheel speed measurement further includes a filtering and differentiating of said wheel speed measurement.

* * * * *

UNITED STATES PATENT AND TRADEMARK OFFICE
CERTIFICATE OF CORRECTION

PATENT NO. : 5,132,906

DATED : July 21, 1992

INVENTOR(S) : David Sol et al

It is certified that error appears in the above-identified patent and that said Letters Patent is hereby corrected as shown below:

| | |
|---|---|
| Col. 6, line 27, | "value o the" should read --value of the--. |
| Col. 6, line 39, | "on a road surface e" should read --on a road surface--. |
| Col. 6, line 41, | "comprising the steeps of" should read --comprising the steps of--. |
| Col. 6, line 58, | "value o the" should read --value of the--. |
| Col. 6, line 61, | "level of rake pressure" should read --level of brake pressure--. |
| Col. 7, line 12, | "and pl inputing" should read --and inputting--. |
| Col. 7, line 14, | "value o the" should read --value of the--. |
| Col. 7, line 28, | "coefficient of fraction" should read --coefficient of friction--. |
| Col. 7, line 55, | "of faction o the road" should read --of friction of the road--. |
| Col. 7, line 60, | "inputing" should read --inputting--. |
| Col. 8, line 20, | "wheel sped" should read --wheel speed--. |
| Col. 8, line 53, | "the rod surface" should read --the road surface--. |
| Col. 8, line 55, | "slope form said" should read --slope from said--. |
| Col. 8, line 66, | "mans" should read --means--. |
| Col. 8, line 67, | "a fraction control" should read --a traction control--. |
| Col. 9, line 4, | "hill slope, he" should read --hill slope, the--. |
| Col. 9, line 21, | "value o the" should read --value of the--. |
| Col. 9, line 28, | "coefficient of fiction" should read --coefficient of friction--. |
| Col. 9, line 30, | "said list" should read --said first--. |
| Col. 9, line 48, | "rake torque" should read --brake torque--. |

UNITED STATES PATENT AND TRADEMARK OFFICE
CERTIFICATE OF CORRECTION

PATENT NO. : 5,132,906

DATED : July 21, 1992

INVENTOR(S) : David Sol et al

It is certified that error appears in the above-identified patent and that said Letters Patent is hereby corrected as shown below:

Col. 10, line 17, "sand said" should read --and said--.
Col. 10, line 20, "a bake control" should read --a brake control--.
Col. 10, line 39, "at last one" should read --at least one--.
Col. 11, line 4, "a fraction control" should read --a traction control--.

Signed and Sealed this

Fourteenth Day of September, 1993

Attest:

BRUCE LEHMAN

*Attesting Officer*     *Commissioner of Patents and Trademarks*